United States Patent [19]
Young et al.

[11] Patent Number: 5,254,928
[45] Date of Patent: Oct. 19, 1993

[54] POWER MANAGEMENT SYSTEM FOR BATTERY POWERED COMPUTERS

[75] Inventors: Steven J. Young, Milpitas; Markus Wallgren, Palo Alto, both of Calif.

[73] Assignee: Apple Computer, Inc., Cupertino, Calif.

[21] Appl. No.: 770,193

[22] Filed: Oct. 1, 1991

[51] Int. Cl.⁵ ............................. H02J 7/10; H02J 9/00
[52] U.S. Cl. ....................................... 320/14; 320/21; 320/44; 307/66
[58] Field of Search ................. 320/14, 44, 39, 21; 307/66

[56] References Cited

U.S. PATENT DOCUMENTS

| | | | |
|---|---|---|---|
| 3,484,681 | 12/1969 | Grady, Jr. et al. | 320/44 X |
| 3,898,548 | 8/1975 | Perelle et al. | 320/44 X |
| 4,307,330 | 12/1981 | Belot | 320/44 |
| 4,716,354 | 12/1987 | Hacker | 320/39 |
| 4,746,852 | 5/1988 | Martin | 320/14 X |
| 4,965,738 | 10/1990 | Bauer et al. | 320/39 X |

*Primary Examiner*—R. J. Hickey
*Attorney, Agent, or Firm*—Jonathan B. Penn

[57] ABSTRACT

A power management system for a portable computer is disclosed. The system can determine which one of a plurality of battery packs has been coupled to the system. After determining the type of battery pack, the system recalls from storage the recommended charging pattern for the particular battery pack and begins to charge the battery at the recommended rate. The system's information is used during charging to determine if the battery pack is defective. When the computer is running off the battery pack, the charge counter measures the total amount of charge supplied to the computer and provides this information to the system. When the difference betweem the total amount of charge supplied to the computer and the total charge available from the battery reaches a predefined limit, the system indicates to the computer that a low-power situation exists and that the computer should prepare for a possible loss-of-power event.

2 Claims, 7 Drawing Sheets (Ni Cad)

POWER MANAGEMENT SYSTEM FOR BATTERY POWERED COMPUTERS

BACKGROUND OF THE INVENTION

This invention is in the field of electronic power supplies. In particular, it relates to microprocessor controlled power supplies for battery powered personal computers.

Portable computers are one of the fastest growing segments of the computer market. As the capabilities of these machines have increased, and as their size has decreased, the advantages of computer technology have become almost universally available. Although such portable computers can be used in a fixed base mode of operation, during which operation they are connected to a conventional, A.C. power supply, it is at least equally likely that these portable computers will be used in places where A.C. power is not available, such as within an airplane. During use in such environments, portable computers rely on their internal battery packs for power.

Sophisticated battery packs and related power supplies are an absolute necessity for portable computers. A portable computer must be able to operate continuously for a reasonable amount of time with a fully charged battery pack. Additionally, sudden power failures, with their consequent loss of data, must be kept to an unavoidable minimum. As a matter of course, the battery pack and power supply should together provide some indication to the user that power is about to be lost, so that data can be stored and a graceful shut-down effected.

Unfortunately, many new types of battery packs used in portable computers make the task of determining loss-of-power events very difficult. As shown in FIG. 1, the voltage output of some battery packs declines relatively linearly with use, with the battery pack's voltage level dropping towards the discharge voltage toward the end of the battery pack's charge. At some point, the battery pack will not provide enough capacity for the computer to operate. If this point is reached without warning, data will be lost.

Determining the warning point when the power supply must signal the user to save data prior to final loss-of-power is not a simple task. Battery discharge can be affected by such factors as temperature, battery type, the load on the battery, the battery's age, and the recharge method and number of recharge cycles that the battery has undergone. All these factors result in a non-linear voltage output versus time of use curve for the battery pack, which non-linear curve is much more typical of battery pack performance than the more nearly linear performance of sealed lead acid batteries illustrated in FIG. 1. A particular example of this is shown in FIG. 2, which illustrates the time of use versus voltage output curve of a nickel-cadmium ('NiCad') battery pack. As shown in the figure, this type of battery pack continues to output at the same, high level (roughly within 5% of the original output level) for a very large percentage of its output time. However, once a certain point is reached, the NiCad's voltage output drops very rapidly towards zero. With such a battery, it is quite difficult to determine when proper power-down warning should be given to the user.

To date, most manufacturers have dealt with the problem of warning of loss-of-power by simply making a very conservative estimate of the total capacity in a fully charged battery pack and then signaling a low-power warning at a time when it is certain that sufficient power remains in the battery pack to achieve a successful shut-down. This conservative estimate not only forces the user to either stop using the computer or change batteries sooner than would ideally be necessary, but can also affect future charge-discharge patterns of the battery, as the recharging process begins with only a partially discharged battery.

There are many additional shortcomings in known portable computer power supplies. Most such circuits can only function with one specific type of battery pack. Modification of the supply to deal with other types of battery packs is either impossible or very difficult. Further, such circuits only make a crude estimate of the total charge in a given battery pack and cannot provide an optimum recharge to the battery pack. Likewise, as the supplies do not compensate for such factors as temperature or current drain, their estimates of remaining battery life and proper recharge can be very wrong. In some cases, the estimate is sufficiently wrong that even the conservative estimate made to signal "power off" is incorrect and results in a failure to provide adequate warning of loss-of-power and lost data.

A power supply capable of making more precise power measurements and providing optimum recharge currents, compensating properly for variations in environmental factors, would be of great advantage to the portable computer industry.

SUMMARY OF THE INVENTION

A first preferred embodiment of the present invention comprises a microprocessor controlled power management system for a battery powered portable computer. In the first embodiment, the system comprises an 8-bit microprocessor with an on-board, read-only memory ('ROM'), a random access memory coupled to the microprocessor, a power management unit ('PMU') coupled to the microprocessor, the PMU also having an A.C. power connection, for use when A.C. power is available, and a connection to the battery. The PMU supplies power to the computer, including the central processing unit ('CPU'), the hard disk drive, the display, etc., through a coulomb counter.

The first preferred embodiment of the present invention uses a nickel-hydrogen ("NiH") battery pack. Although any other type of battery pack could be used by modifying the software in the present invention, the operation of the invention will be described with reference to this particular type of battery pack.

Once the battery pack is installed in the portable computer, the present invention determines the type of battery pack by means of an identification scheme, possibly a resistor in the pack. If A.C. power is available, the invention will check the charge on the battery pack. If it is not fully charged, and the ambient temperature and battery temperature are within predefined limits, charging will begin.

As charging begins, following the stored charging instructions for the given battery type, the microprocessor checks the voltage level of the battery pack. At periodic intervals, the system measures the battery pack's voltage level. If there is a discrepancy between the amount of charge supplied by the system to the battery pack and the voltage level now available, and this discrepancy reaches a predetermined minimum, charging is completely stopped and a "bad battery"

indication is sent to the CPU for display on the computer. These tests prevent overcharging a defective battery, with the severe consequences that can follow, especially given the increasing energy density of various new types of battery packs.

A set of temperature sensors, including one on or near the battery pack and one near the computer's CPU, constantly monitor the temperature within the computer and in the battery pack. By properly processing the temperature data, a further determination of the battery pack's condition during charging and operation can be obtained. For example, if the derivative of the temperature data is not a constant, this can indicate either that there is some problem with the battery or the charging circuit or that the battery is fully charged.

After the battery has been completely charged, the system assumes that the battery pack can supply a predetermined amount of power. During operation of the computer, the invention's coulomb counter monitors the amount of charge flowing from the battery pack to the computer. When the difference between the predetermined total charge and the consumed charge reaches the minimum necessary for a safe power-down, the invention signals the CPU so that the shut-down can be performed.

An additional feature present in a second embodiment of the present invention is the ability of the invention to read charging data from the CPU's RAM when a new battery pack of unknown type is connected to the computer. If the invention detects a battery ID whose value is not stored in the invention's RAM, the invention queries the CPU, which should have the charging data for this new type of battery pack in its RAM. If it does, this information is downloaded to the invention's RAM for future use.

Another feature present in additional embodiments of the present invention is the incorporation of a unique identification number within each battery pack. This may be done by means of a small battery backed static RAM ("SRAM"), an electrically erasable, programmable read-only memory ("EEPROM") or other, similar devices. When a battery pack having such a serial number stored therein is inserted into a portable computer incorporating the present invention, the present invention reads the identification number and determines if that battery pack has been used with the computer before. If it has, a counter which tracks the total number of charge and recharge cycles for the particular battery pack is updated. In the case of a new battery pack, a new counter is started. By tracking the total number of charge cycles, the present invention can adapt the charging pattern to accommodate the aging characteristics of the battery pack. This increases the battery pack's usable lifespan, as well as increasing the total amount of power that the pack can deliver.

These features and others will now be described in detail, with reference to the figures listed and described below.

DESCRIPTION OF THE PREFERRED EMBODIMENTS

Figure 1:
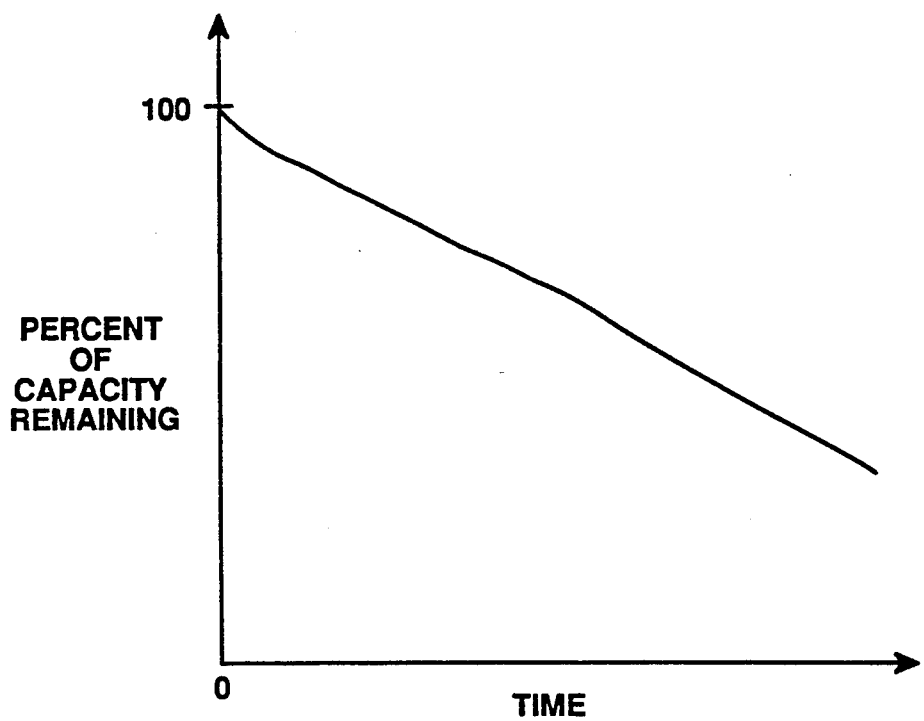
FIG. 1 is a graph of the time of use versus voltage output of a sealed lead acid battery pack.
Figure 2:
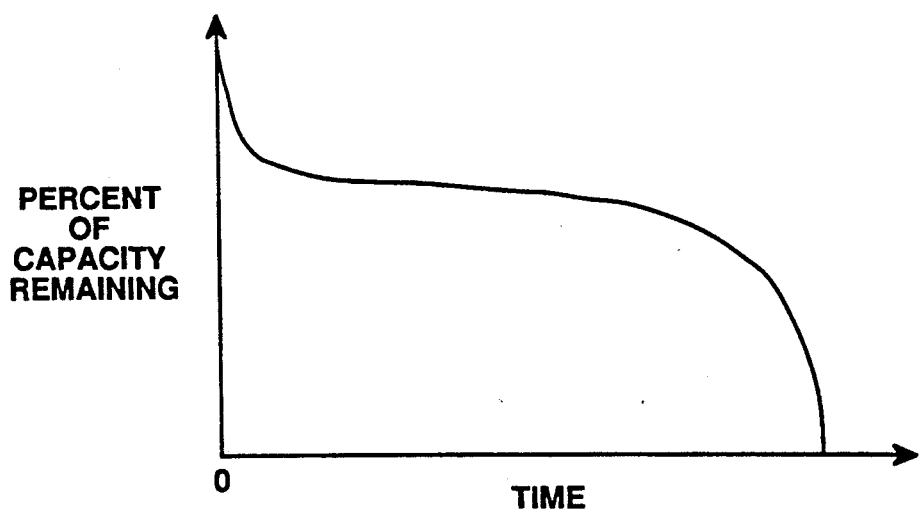
FIG. 2 is a graph of time of use versus voltage output for a NiCad battery pack.
Figure 3:
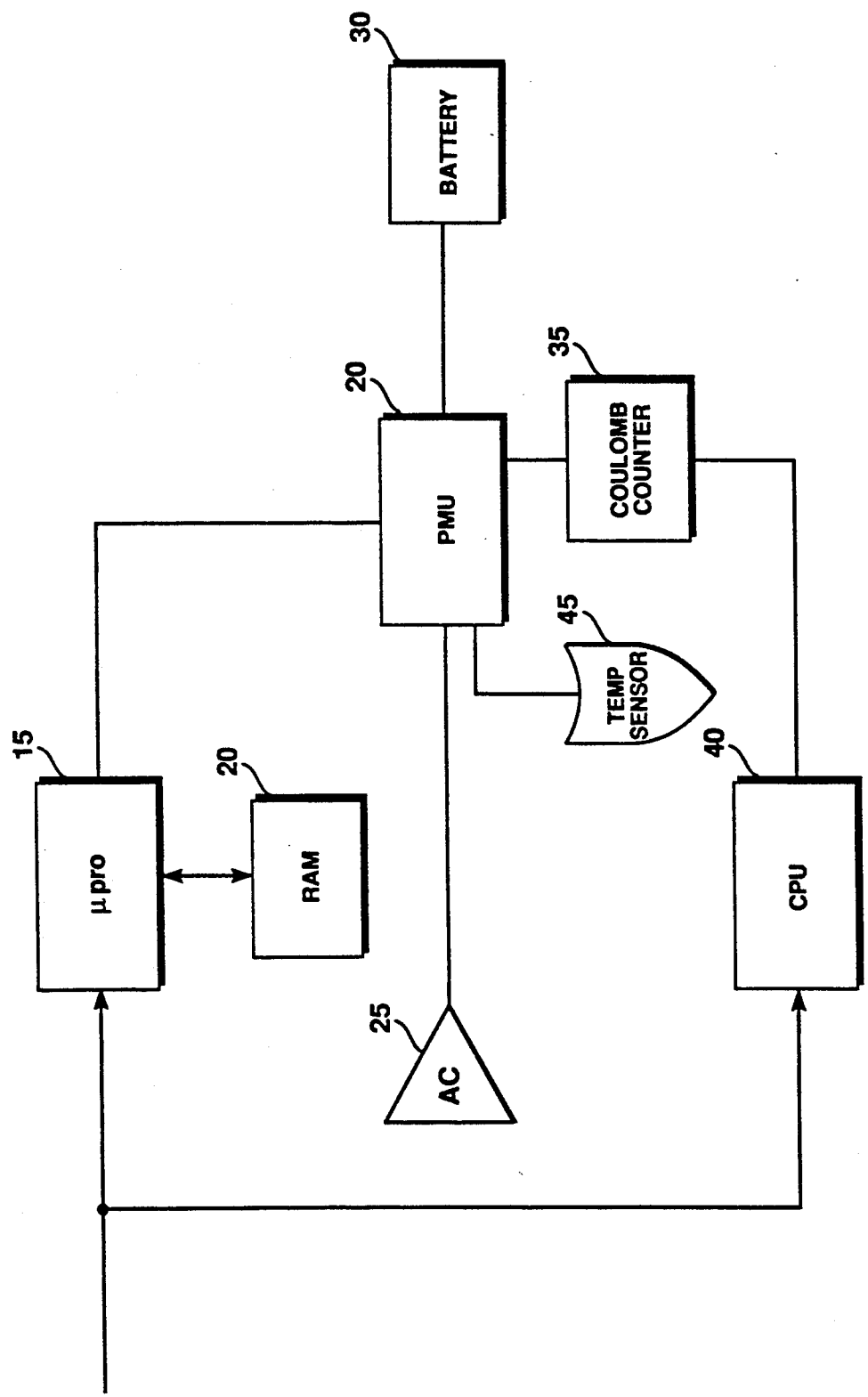
FIG. 3 is a block diagram of the present invention.

A block diagram of the present invention is shown in FIG. 3. As shown in the figure, system 10 is comprised of microprocessor 15, RAM 20 coupled to microprocessor 15, PMU 20 coupled to microprocessor 15, A.C. power supply 25, battery pack 30 and temperature sensor 45, and coulomb counter 35. Coulomb counter 35 is in turned coupled to the computer's CPU 40. Microprocessor 15 is also coupled to CPU 40.

In the first preferred embodiment, microprocessor 15 is comprised of a custom microcontroller available from Motorola and having a part number MC68HC05PG&E. Its relevant features for purposes of this invention include on-board RAM 20 and Read-Only Memory ('ROM'), multi-channel 8-bit A/D converters and several I/O ports. As microprocessor 15 is known, no further description of it is necessary here.

Figure 4:
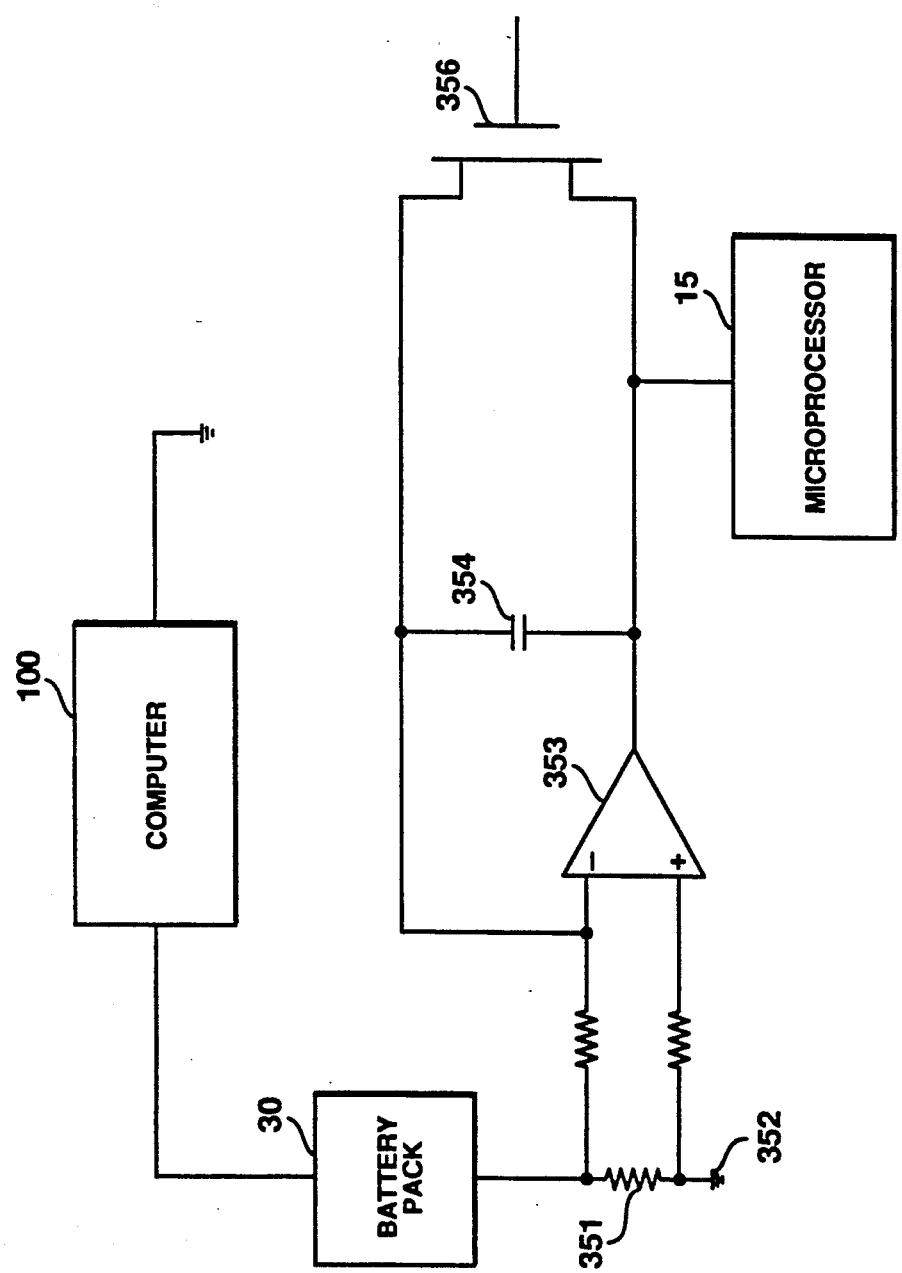
FIG. 4 is a schematic drawing of the coulomb counter of the present invention.

A schematic of coulomb counter 35 is shown in FIG. 4. As shown in that figure, current from battery pack 30 flows through current sensing resistor 351 to ground 352. It should also be noted that when current is flowing through the sensing resistor, it is also flowing through the other components of the computer system, represented in this figure by computer 100. The voltage drop registered over resistor 351 is sensed and amplified by operational amplifier 353. The amplified output voltage is in direct proportion to the current going through resistor 351 as a result of Ohm's Law ($V=IR$). Although no particular value for resistor 353 is critical, the smaller it is, the less current it dissipates, thereby reducing the load on battery pack 30. In this embodiment, resistor 351 is 0.1 ohm.

The output voltage from amplifier 353 is used to charge capacitor 354, which is a special low-leakage capacitor. In this configuration, capacitor 354 acts as an integrator, summing the total current flowing through resistor 351 in a given sampling period. In the preferred embodiment, the sampling period is about 1 second. Microprocessor 15 is coupled to capacitor 354 and samples the voltage thereon once every sampling period, maintaining a running total of the charge that has been placed into battery pack 30 during each sampling interval. Field Effect Transistor ('FET') 356 is used to short capacitor 354 to ground so as to reset it after each sampling period.

Figure 5A:
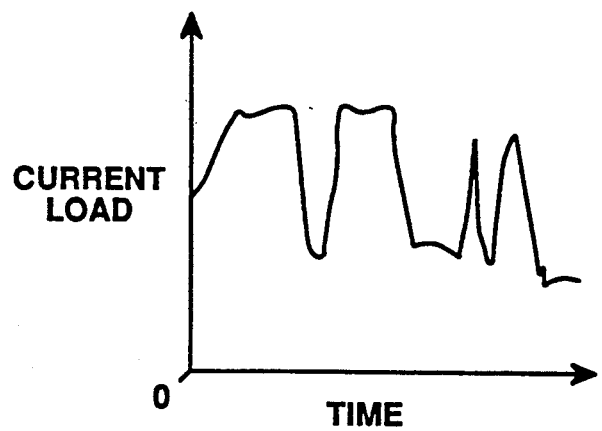
FIG. 5 is a set of graphs showing the voltage on the coulomb counter's capacitor in response to load changes in the portable computer.
Figure 5B:
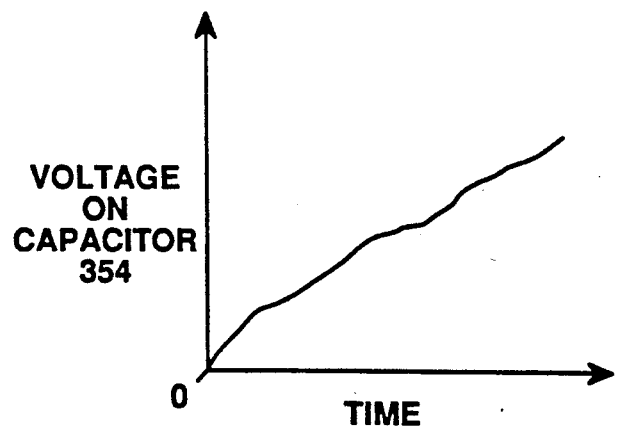

As shown in FIG. 5, the current load on a battery in a portable computer varies greatly with time, as various components such as the hard disk, microprocessor, and display, are turned on and off to save power. This contrasts with the current load in desktop computers, which tends to be constant as all its components are constantly running. Given that current usage varies widely and frequently, it might appear that very frequent sampling of the current load would be necessary for an accurate coulomb count. However, frequent sampling would have the disadvantage of increasing microprocessor usage, which in turn would increase current drain. Instead, the present invention integrates the total current used by the computer within a predefined time period by means of capacitor 354 and then samples capacitor 354 and stores the value thereon in microprocessor 15's RAM memory 20. FIG. 5a shows how the current load varies over time as various different components of the computer system are turned on and off. FIG. 5b shows how coulomb counter 35 integrates the amount of current used over a predetermined period and then provides this value to microprocessor 15 once every sampling period.

Figure 6:
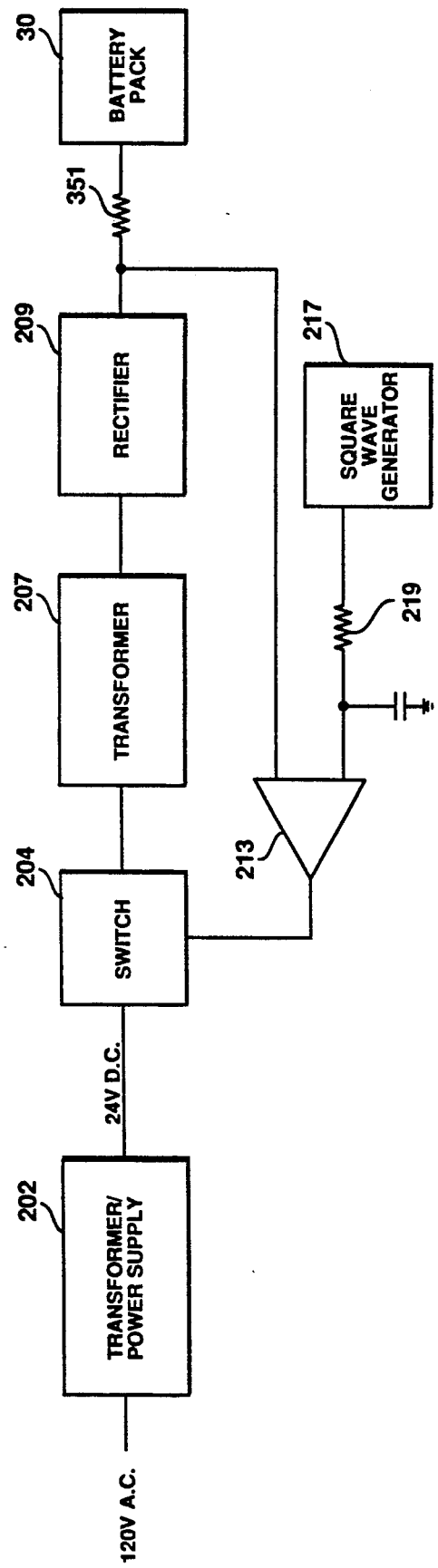
FIG. 6 is a schematic of the PMU.

FIG. 6 is a schematic of portions of PMU 20. When coupled to an 120 V A.C. power source, transformer and power supply 202 provides a 24 V D.C. output. This 24 V D.C. output is applied to switch 204.

In the first preferred embodiment, switch 204 is an LT 1171 integrated circuit which functions as an electronic switch and which contains a built-in 100 KHz clock. The output of switch 204 is a square wave whose duty cycle may be varied, depending upon the amount and type of feedback applied to the switch. The output of switch 204 is applied to transformer 207. Varying the duty cycle of switch 204's output results in a sinusoidal output of varying amplitude from transformer 207. This sinusoidal output is rectified in rectifier 209 to provide a D.C. output voltage and current, which in turn flows through sensing resistor 351 into battery pack 30.

One input of amplifier 213 is coupled to the output of rectifier 209. Amplifier 213 is used to generate the feedback necessary to control the duty cycle of switch 204 and uses the voltage appearing on battery pack 30 as the means to do so. Square wave generator 271 provides a square wave having a 0 volt minimum and +5 volt maximum amplitude and a frequency of 1 KHz. The output of generator 217 is provided to RC network 219. RC network averages the square wave input it receives and generates a D.C. output of about 2 volts, which is in turn supplied to one input of amplifier 213. In this configuration, amplifier 213 acts as a voltage comparator. As the voltage on battery pack 30 increases, the output of amplifier 213 remains high for for an increasing amount of time. This output is applied to switch 204, thereby decreasing the duty cycle of switch 204's output, which in turn results in a decreasing charging voltage. Thus, the present invention insures that batteries are charged at a gradually decreasing rate as the total charge on the battery pack increases.

Battery pack 30 can be any of several commonly used types of batteries, including alkaline or nickel-cadmium. In the near future the availability of battery packs based on lithium ('Li') batteries, NiH, as well as portable sealed lead-acid batteries is anticipated. All can be used with the present invention. The only specific alteration to these battery packs for use with the present invention is the incorporation of an identifying scheme within each battery pack. When coupled to a portable computer having the present invention, microprocessor 15 reads the value of this scheme using known circuit analysis technique. The value of the scheme indicates the type of battery pack and allows the microprocessor to recall charging data from RAM 20, as well as other relevant information stored for the battery pack. As stated earlier, for purposes of this description only, the operation of the present invention will be described when a NiH battery pack is used.

The physical components of the present invention have now been described. What follows is a description of the operation of the present invention with a typical battery pack.

Figure 7:
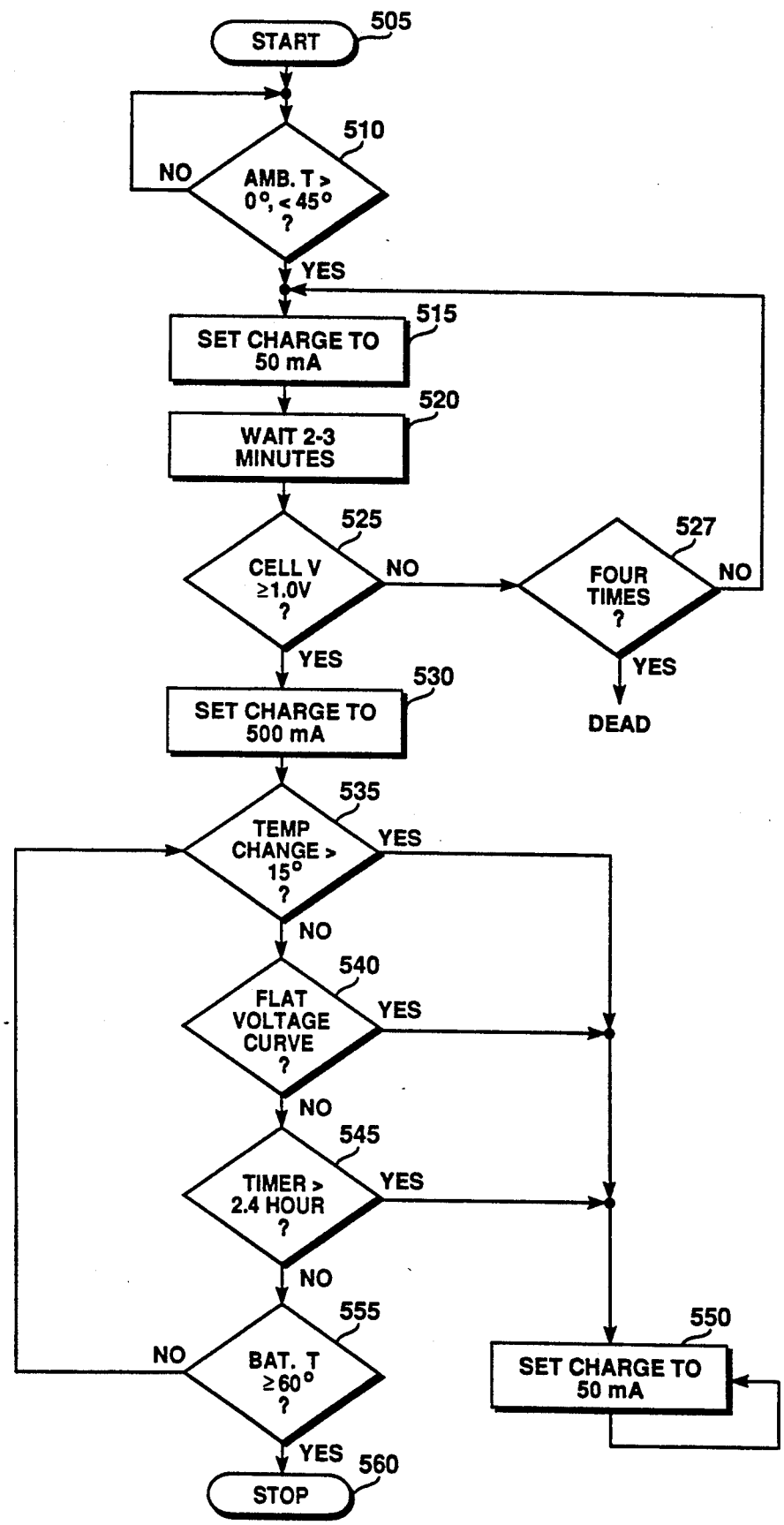
FIG. 7 is a flow chart of the present invention's operation when a new battery pack is inserted.

The actions taken once a NiH battery pack is coupled to the present invention are illustrated in FIG. 7. Start 505 assumes the correct installation of a NiH battery pack and the availability of an A.C. power source. Interruption of the A.C. power supply automatically terminates charging operations. Temperature sensor 45 within the present invention determines the ambient temperature. If this temperature is not between 0 and 45 c, as determined at step 510, charging does not begin. The temperature test is continually repeated until the ambient temperature is within the predetermined range. If the temperature is within the predetermined range, the charging rate is set at 50 mA and charging is started, as indicated by step 515. Step 520 indicates that charging at the 50 mA rate continues for about 2 to 3 minutes. After this short charging interval, charging is halted and the voltage of the battery pack is tested at step 525. If the voltage does not equal at least 1 volt per battery cell or 10 volts per battery pack, steps 515 and 520 are repeated. A counter which tracks the number of times that this test is repeated is also set (not illustrated). If steps 515 and 520 are repeated four times and the voltage still does not exceed 1 volt, charging is stopped and a "dead battery" indication is sent to CPU 40, which will provide the proper notice to the computer's user. This testing process is illustrated by step 527.

If the voltage on the battery pack does equal or exceed 10 volt, then the charging rate is reset to 500 mA at step 530. During the time that charging continues at the 500 mA rate, several tests are conducted on a continuous basis. The first test, at step 535, determines whether the temperature of the battery pack has increased by more than 15 c. If it has, the charging rate is reset to a trickle charge level at step 550. The level of this trickle charge for a NiH battery pack is 50 mA.

At step 540, a determination is made as to whether the voltage curve of the battery pack is flat. NiH battery packs have a special charge characteristic that results in a decrease in voltage level if the charging process continues too long. Thus, if the test at step 540 results in a determination that the voltage curve is flat, then step 550 is reached and the charging rate is reduced to the appropriate level.

Another test, indicated by step 545, determines whether the charging process has gone on for more than 2.4 hours. If it has, step 550 is again reached and the charging rate is reduced.

A final safety check is conducted at step 555. If, during the charging process, the battery pack's temperature has equaled or exceeded 60 c, then all charging is halted and no further attempt is made to charge or use the battery pack. Such a high temperature would indicate the complete failure of the battery pack and/or the charging circuit. In either event, using the battery pack would be dangerous to the computer and, quite possibly, to the user. This halting of operation is indicated by step 560.

Tests 535, 540, 545, and 555 are repeated until charging is completed. It must be noted that during the entire charging process, including the initial low rate charge, as well as the high rate and trickle rate, the CPU records the entire amount of the charge supplied to the battery. It should be noted that any or all of the many tests and charging rates can be readily changed to accommodate different battery types, merely by changing the particular charging parameters stored in RAM 20.

Figure 8:
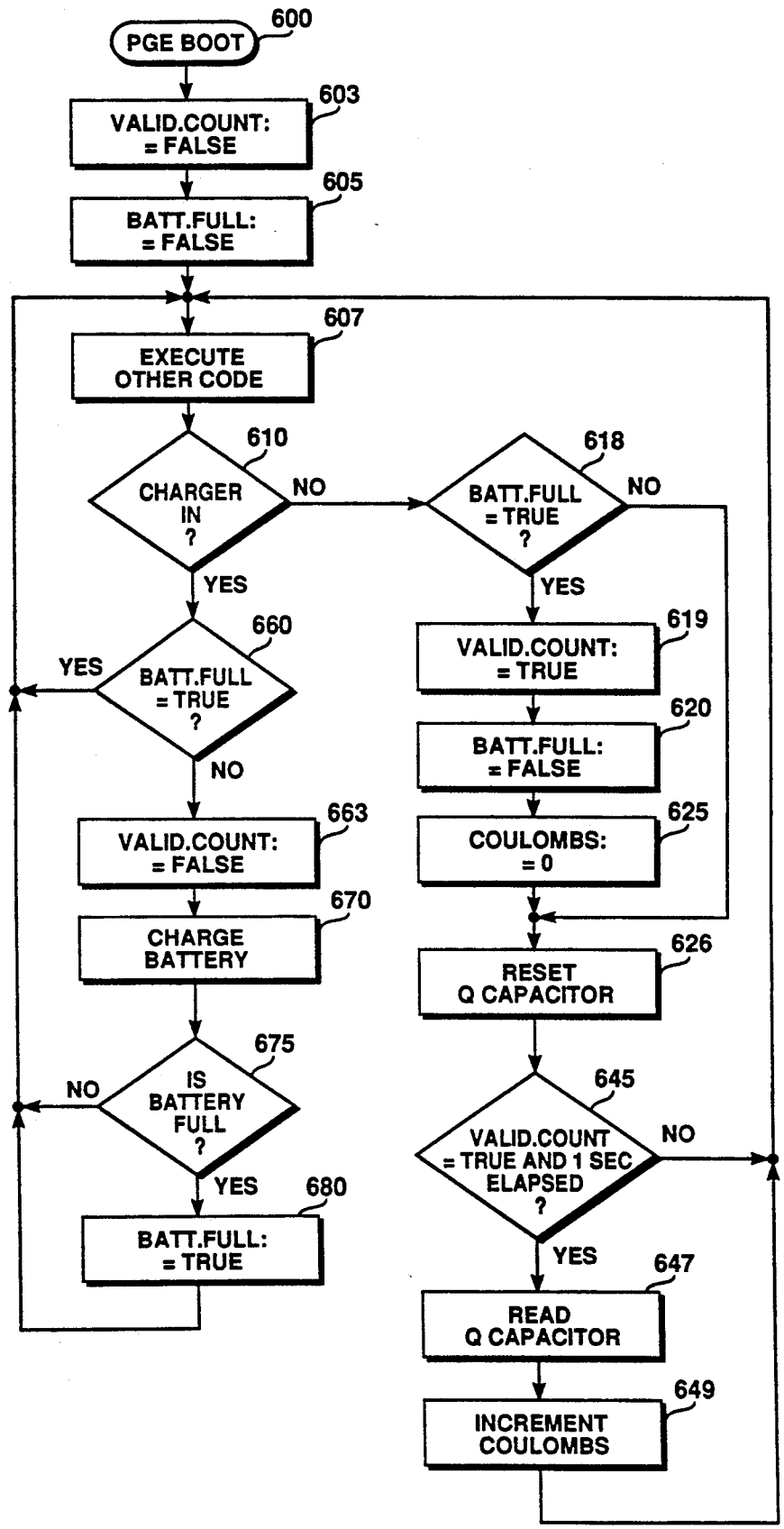
FIG. 8 is a flow chart of the present invention's operation during periods of computer operation.

The flow chart shown in FIG. 8 represents the operation of the present invention from the moment when power is turned on in the portable computer. This moment of "power-on" or booting is represented by step 600. At step 603, a coulomb counter test variable is set to false, on the assumption that the computer is using the battery pack to provide power. Additionally, and for the same reason, a test flag indicating that the battery is fully charged is turned to false (Step 605). At step 607, the execution of other computer code not relevant to the present invention is indicated. As all such code is of finite size, control eventually returns to the execution of the program illustrated in FIG. 6. The numerous conditions which result in a return to the program are not relevant to this description. Upon returning from the execution of other code, a check is made to see if the battery charger is in (step 610). If the charger is in and the flag indicating a fully charged battery is set to true (step 660), then other code is executed, as indicated by step 607.

If the charger is connected, but the battery charge flag is false, the coulomb count test variable is set to false, indicating to microprocessor 15 that the count previously stored can no longer be used (Step 663). Next, charging operations commence as described previously with reference to FIG. 5 (Step 670). Once the battery is fully charged, the battery charge flag is reset to true (Step 680) and other code is executed (Step 607). If the test at step 675 indicates that the battery is not full, operation continues at step 607, where other code is executed until the battery charging software is once again encountered.

If the test at step 610 indicates that the charger is not connected, then the system again checks to see whether the battery pack is fully charged or not (Step 618). If it is fully charged, then the coulomb counters validity variable is set to true (Step 619), the battery test variable, which indicates whether or not the battery pack is full, is set to false (Step 620), the coulomb counter is initialized to zero (Step 625), and the coulomb counter's test capacitor is reset (Step 626). If the battery pack was not fully charged, then the test capacitor is reset without intervening steps (Step 626).

After resetting the capacitor at step 626, the system next checks to see if the coulomb counter's test variable is true and if one second has elapsed since the last time this test was performed (Step 645). If both conditions are true, the test capacitor's voltage is read and the amount of charge thereon is used to increment the coulomb counter (Steps 647 and 649). The system then returns to the execution of other code as indicated by step 607. Alternatively, if the test conditions indicated in step 645 were not both true, execution immediately returns to other system programs at step 607.

Although the invention has been explained with reference to the foregoing embodiments, it should be apparent to one skilled in the art that numerous changes and modifications may be made thereto without departing from the scope or spirit of the invention. For example, each battery pack might, in some future embodiment, incorporate a small static memory, which would indicate the type of battery contained therein, its optimum charging rate over a range of temperatures, and its previous charge and discharge cycles. Upon insertion of the battery pack into a computer having the present invention, this data would be read from the battery pack's memory and then used by the microprocessor of the present invention to customize the charging pattern for the individual battery pack. Another envisioned addition to the present invention is the incorporation of a test which will fully charge the battery and then discharge it fully, thereby determining the total amount of charge that the battery pack in that particular computer can deliver. This total would then be compared with the running total maintained by the coulomb counter to determine when a low-power indication should be generated. This would allow the system to accommodate individual variations in battery capacity. Given the range of modifications that would be necessary to realize this embodiment, and other easily envisioned modifications, the present invention should be limited only in accordance with the appended claims.

What is claimed is:

1. A battery charging circuit with self-adjusting charging voltage levels, the circuit comprising:
   first transformer means for converting an A.C. voltage to a D.C. voltage;
   oscillator means coupled to the first transformer means for converting the D.C. voltage to a square wave of fixed amplitude but variable duty cycle;
   second transformer means coupled to the oscillator means for converting the square wave to a sinusoidal wave, the amplitude of the sinusoidal wave varying directly with the duty cycle of the square voltage wave;
   rectifier means coupled to the second transformer means and a battery, for converting the sinusoidal wave to a D.C. charging voltage; and
   voltage comparator means having at least two inputs, a first input being coupled to an output of the rectifier means, a second input being coupled to a square wave generator, the output of the comparator means being coupled to the oscillator means, the comparator means decreasing the duty cycle of the oscillator means when the output of the comparator is high, the decrease in the duty cycle resulting in less voltage at the output of the second transformer means.

2. A power management system for a computer, the computer being powered by one of a plurality of battery packs, the system comprising:
   power charging means coupled to the battery pack and an A.C. power supply for charging the battery pack, the power charging means further comprising a means for supplying a self-adjusting voltage charge level to the computer, the means comprising:
   first transformer means for converting an A.C. voltage to a D.C. voltage;
   oscillator means coupled to the first transformer means for converting the D.C. voltage to a square wave of fixed amplitude with a variable duty cycle;
   second transformer means coupled to the oscillator means for converting the square wave to a sinusoidal wave, the amplitude of the sinusoidal wave varying directly with the duty cycle of the square voltage wave;
   rectifier means coupled to the second transformer means and the battery pack, for converting the sinusoidal wave to a D.C. charging voltage; and
   voltage comparator means having a least two inputs, a first input being coupled to the output of the rectifier means and the second input being set a predefined D.C. voltage level, the output of the comparator means being coupled to the oscillator means, the comparator means decreasing the duty cycle of the oscillator means when the output of the comparator is high, the decrease in duty cycle resulting in less voltage at the output of the second transformer means;

controller means coupled to the power charging means and the computer, the controller means having a memory means for storing battery type and charging rate information, the controller means receiving battery type information from the battery pack through the power charging means and supplying charging rate information to the power charging means; and charge measuring means coupled to the battery pack, the computer, the power charging means and the controller means, the charge counter means measuring the amount of charge that has flowed into the computer, the discharge information being provided to the controller means for generating a low-power warning when the discharge amount reaches a predefined limit.

* * * * *